United States Patent [19]

Fukino

[11] 4,042,943
[45] Aug. 16, 1977

[54] STOPPING DEVICE FOR BELLOWS AND CLOSE PHOTOGRAPHY RING

[75] Inventor: Kunihiro Fukino, Kawasaki, Japan

[73] Assignee: Nippon Kogaku K.K., Tokyo, Japan

[21] Appl. No.: 622,518

[22] Filed: Oct. 15, 1975

[30] Foreign Application Priority Data

Oct. 21, 1974 Japan .............. 49-127166[U]

[51] Int. Cl.² .............................................. G03B 9/02
[52] U.S. Cl. .................................................. 354/272
[58] Field of Search .............. 354/202, 288, 232, 270, 354/272, 23

[56] References Cited

U.S. PATENT DOCUMENTS

| | | | |
|---|---|---|---|
| 2,906,166 | 9/1959 | Herterich | 354/23 X |
| 2,906,188 | 9/1959 | Tesch | 354/272 |
| 3,062,120 | 11/1962 | Mahn | 354/270 |
| 3,081,685 | 3/1963 | Schlapp et al. | 354/232 |
| 3,098,421 | 7/1963 | Ohara | 354/272 |
| 3,143,945 | 8/1964 | Ludwig et al. | 354/232 |
| 3,291,023 | 12/1966 | Starp | 354/272 |
| 3,889,283 | 6/1975 | Rossmann | 354/272 |

Primary Examiner—Donald A. Griffin
Attorney, Agent, or Firm—Shapiro and Shapiro

[57] ABSTRACT

A stopping device is provided for stopping at an optional predetermined position the stop of a phototaking lens which has been in the fully open position when the lens was mounted. A stop interlocking member engages with a stop lever of the phototaking lens at its fully open stop position and is movable a distance which corresponds to the moving distance of the stop lever from its fully open stop position to its minimum opened stop position. The stopping member in engagement with the stop interlocking member is operable to move the stop interlocking member, and means is provided to stop the stopping member when the stop interlocking member has been moved the desired distance.

5 Claims, 4 Drawing Figures

STOPPING DEVICE FOR BELLOWS AND CLOSE PHOTOGRAPHY RING

BACKGROUND OF THE INVENTION

1. Field of the Invention

This invention relates to a stopping device used for a bellows focusing attachment or a close photography ring to stop the phototaking lens at an optional position which has been at its fully opened position as mounted.

2. Description of the Prior Art

Heretofore when a bellows focusing attachment or close photography ring is mounted on a camera of the through the lens photometry type, the stop is stepped at a predetermined position; that is, the photometry has been made by the so-called stopping photometry. On the other hand, when using a lens of the type of which the stop is at its fully opened position when mounted, observing the depth of field is accomplished by stopping the lens stop by a simple operation. When the bellows focusing attachment and the close photography ring equipped with a specific interlocking member to interlock the stopping device of the camera and the stop lever of the lens, or the bellows focusing attachment and the close photography ring equipped with the lens provided with the stopping means is used, it is possible to make the stopping operation optionally. However, the operability is poor. In known devices other than the aforementioned two conventional devices, it is necessary to include a mechanism to move the stop lever of the lens. Such mechanism is generally in the form of an intermediate ring inserted between the bellows and the lens. When focusing is necessary, this intermediate ring moves a member connected with the stop of the lens to the fully opened stop position and locks it at this position, and a lock releasing member which is quite complex in structure has been needed.

In case of an intermediate ring which does not have an associated lock releasing member, it is not possible to stop unless the shutter release member, such as a double cable release, is operated. However, if the shutter is charged, then the shutter is released and the film is exposed to light. Further, the shutter release member is constructed to operate the stopping before the shutter is released. Thus, it may be possible to cease the release operation at the position of the stopping just before the shutter is released and retain it at this position. However, if there is the slightest deviation from such position, it is impossible to determine the exposure and the selection of the stop and shutter speed becomes inconvenient.

SUMMARY OF THE INVENTION

This invention overcomes the disadvantages and limitations of the known devices hereinbefore described, and provides a stopping device for a bellows and a close photography ring which is comparatively simple and easy to switch between the fully opened stop and a predetermined aperture size.

DESCRIPTION OF THE PREFERRED EMBODIMENT

Figure 1:
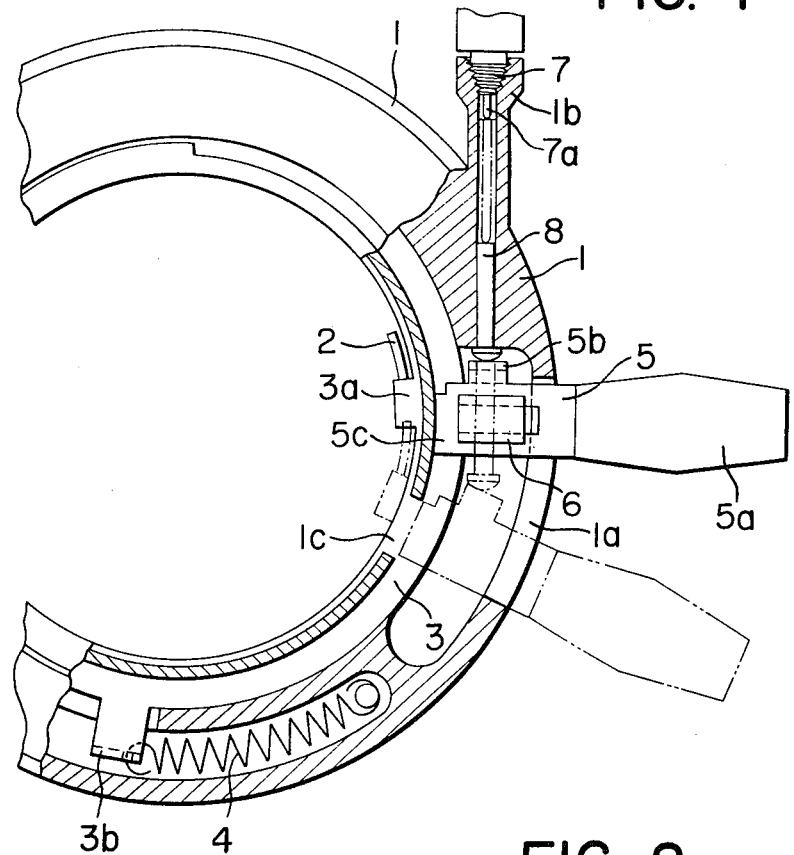
FIGS. 1 and 2 show an embodiment of the invention in which the stopping device is adapted to an intermediate ring mounting of a phototaking lens of which the stop is normally biased toward its minimum aperture size.
Figure 2:
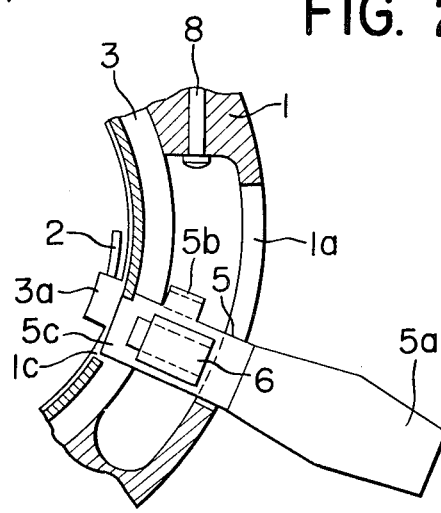

In the device shown in FIGS. 1 and 2, wherein a stop is normally biased toward minimum aperture size, the stop is fully opened so as to serve the operation of the stop of the lens to fully open when focusing is required, and the interlocking of the shutter release is accomplished preceded by a double cable release. The body 1 of the stopping device includes intermediate ring having a stop interlocking ring 3 disposed therein. The ring has a projection 3a in engagement with a stop lever 2 projected from a phototaking lens (not shown). The lever is normally biased in clockwise direction (the minimum aperture size direction). The stop interlocking ring 3 is rotatable by the requiring rotating angle of the stop lever 2. The ring is normally biased in the counter-clockwise direction by a spring 4 provided between the body 1 and the projection 3b of the ring. The biasing force of the spring 4 is greater than the biasing force on the stop lever 2 projected from the lens.

The ring 3 is provided with a stopping lever 5 having a knob 5a which is slidable, with the aid of a guide member 6, to a certain extent inwardly or toward the center of the body 1 (the second direction). The body has a cut-out portion 1a at the periphery thereof to allow the projection therethrough of a knob 5a of the stop lever 5. The periphery of the body is also provided with a projecting connection portion 1b which is internally threaded to receive a matingly threaded portion 7 of a cable release (not shown). The connecting portion 1b is provided with a bore to receive a slidable connecting pin 8. The inner end of the pin is adapted to engage a projection 5b extending from the stop lever 5. At the inner periphery of the body 1, a cut-out portion 1c is provided to receive therein the inner leading end 5c of the stop lever 5.

The relationship between the stop of the lens and the stop lever 2 is shown in FIG. 1, the solid line showing of these parts illustrating the fully opened aperture, and the two dotted lines showing the stopping aperture. The stop interlocking ring 3 is normally biased in counter-clockwise direction by the spring 4, and since the biasing force of the spring 4 is stronger than the biasing force imparted to the stop lever 2 in the clockwise direction, the stop is normally maintained at its fully opened position as shown by the solid lines. Consequently, the focusing is accomplished under this condition. For stopping down the stop to determine the exposure, the stop lever 5, which is actuated in unison with the stop interlocking ring 3, is rotated in the clockwise direction (the first direction) with the aid of the knob 5a until it is stopped by the edge of the cut-out portion 1a, as shown in FIG. 2. As the projection 3a of the stop interlocking ring rotates clockwise (the first direction), the stop of the lens assumes a predetermined position. When the manual pressure on the knob 5a of the stop lever 5 is released, the stop, with the aid of the spring 4, is automatically returned to its fully opened position.

In case of any aperture size other than the minimum aperture size, the stopping down to a predetermined value is attained before the lever 5 is stopped by engagement with the edge of the cut-out portion 1a of the body 1.

To determine the stop and the selection of the stop and shutter time requires the use of both hands. The stop lever 5 is depressed at its stopped down position toward the center of the body 1 (the second direction), the inner leading edge 5c fitting into the cut-out portion 1c as shown in FIG. 2 so that the stopped down state is maintained. After the exposure value is determined, the release button of the double cable release connected to the shutter release button is depressed causing the plunger pin 7a in the connecting portion 1b to be projected to push the projection 5b of the stop lever 5 through the connecting pin 8. As a result, the stop interlocking ring 3 rotates clockwise to stop down the stop of the lens. By a further depression of the release button, the plunger pin 7a at the camera side pushes the shutter release button to release the shutter.

Figure 3:
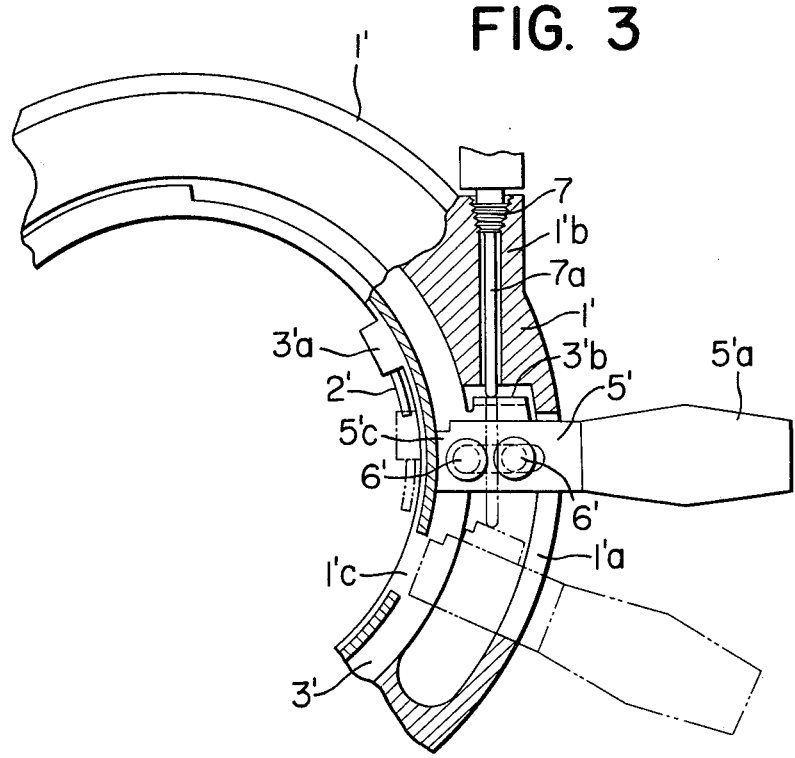
FIGS. 3 and 4 show an embodiment of the invention in which the stopping device is a bellows mounting of a phototaking lens of which the stop is normally biased toward fully open aperture size.
Figure 4:
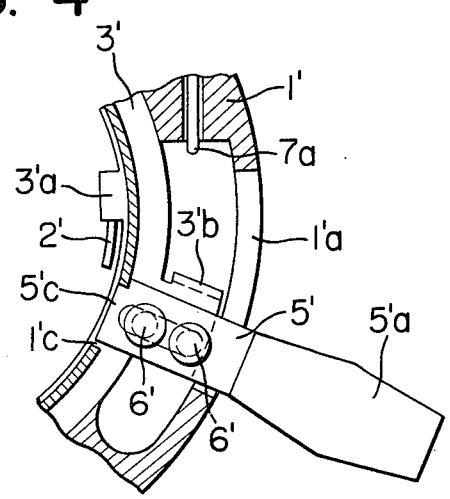

In the embodiment of FIGS. 3 and 4, the stop is normally biased toward the fully opened direction of the stop, and there is no mechanism to fully open the stop. As previously described, the interlocking with the shutter release is made by the double cable release. The same and similar reference numerals refer to the same and similar elements shown in FIGS. 1 and 2.

In the device of FIGS. 3 and 4, the stop interlocking ring 3' is not biased. Whereas in the previous embodiment the stop lever is provided with the projection 5b, in this embodiment the ring 3' is provided with a projection 3'b. The interlocking pin 8 is omitted, and instead, the plunger pin 7a of the double cable release is lengthened to directly engage the projection 3'b on the stop interlocking ring 3'. The stop interlocking ring 3' is provided with a projection 3'a for engagement with stop lever 2. The projection is above the stop lever so that the spring force or bias on the stop lever is imparted to the projection and to the ring 3'. Thus the ring is biased in the same direction, or counterclockwise, as the stop lever, and the stop is maintained at its fully open position.

For stopping down the lens stop, the lever 5' is rotated in the clockwise direction (the first direction) until it is stopped by the edge of the cut-out portion 1a' of the body 1'. Thus, the stop lever 2' of the lens is rotated clockwise (the first direction) by the projection 3'a of the interlocking ring 3'. For maintaining the stop at its predetermined position, the stop lever 5' is depressed inwardly or toward the center of the body 1' (the second direction), as shown in FIG. 4.

When the double cable release is operated for the film exposure, the plunger pin 7a directly pushes the projection 3'b of the stop interlocking ring 3' to rotate it in the clockwise direction (the first direction) so that the stopping operation is made and then the shutter is released.

In the embodiment of FIGS. 1 and 2, the intermediate ring is provided between the bellows or close photography ring and the phototaking lens. It also is possible to apply the stopping device of the invention at the bellows or the close photography lens where the phototaking lens is mounted. In the embodiment of FIGS. 3 and 4, the device can be directly applied to the intermediate ring or close photography ring.

In both of the illustrated and described embodiments, the stop lever 5 or 5' is movable in the second direction at the minimum aperture size position. However, it will be apparent that the second direction need not necessarily be toward the center of the body 1 or 1'.

As explained, when the stop member is moved in the first direction, the stopping is operated, and if the force is released, i.e. the hand is taken off, the stop is automatically returned to its fully opened position. Moreover, after the stopping member has been moved in the first direction, and the stopping member is moved in the second direction, the stopping condition is maintained so that the operability of the stop is improved. Consequently, the exposure determination and identification of the depth of field is simple and easily accomplished.

It is believed that the advantages and improved results furnished by the stopping device of this invention will be apparent from the several preferred embodiments thereof as hereinbefore described. Various changes and modifications may be made without departing from the spirit and scope of the invention as sought to be defined in the following claims.

I claim:

1. A stopping device to be positioned between a camera body and a phototaking lens, the lens having a stop and a stop lever actuating the stop for stopping down the stop at an optional predetermined position, which stop has been in the fully opened position when the lens is mounted, the device comprising:
   a stop interlocking member is engagement with the stop lever at its fully open stop position and movable in a first direction a distance corresponding to the moving distance of the stop lever from its fully open stop position to its minimum stop position;
   a stopping member in engagement with the stop interlocking member and operable to move the stop interlocking member in said first direction; and
   means to stop the movement of the stopping member at the minimum open stop position of the stop lever.

2. A device according to claim 1, wherein said stopping member also is movable in a second direction.

3. A device according to claim 1, wherein said means to stop the stopping member comprises a portion provided by the body of the stopping device.

4. A device according to claim 1, wherein the stop lever is normally biased in the direction of minimum size aperture, and wherein the stop interlocking member is biased in an opposite direction, the biasing force on the stop interlocking member being greater than the biasing force on the stop lever.

5. A device according to claim 1, wherein the stop lever is normally biased toward fully open aperture; and wherein the biasing force on the stop lever is imparted to the stop interlocking member to urge the stop interlocking member toward fully open position.

* * * * *